US012595891B1

(12) United States Patent
Chen

(10) Patent No.: US 12,595,891 B1
(45) Date of Patent: Apr. 7, 2026

(54) VEHICLE EXTERIOR LAMP ASSEMBLY HAVING A HOLOGRAPHIC IMAGE

(71) Applicant: Ford Global Technologies, LLC, Dearborn, MI (US)

(72) Inventor: Linsheng Chen, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 19/073,893

(22) Filed: Mar. 7, 2025

(51) Int. Cl.

| | |
|---|---|
| ***F21S 43/239*** | (2018.01) |
| ***F21S 43/14*** | (2018.01) |
| ***F21S 43/20*** | (2018.01) |
| *F21Y 101/00* | (2016.01) |
| *F21Y 103/10* | (2016.01) |
| *F21Y 115/10* | (2016.01) |
| *F21Y 115/30* | (2016.01) |

(52) U.S. Cl.
CPC ............. *F21S 43/239* (2018.01); *F21S 43/14* (2018.01); *F21S 43/26251* (2024.05); *F21Y 2101/00* (2013.01); *F21Y 2103/10* (2016.08); *F21Y 2115/10* (2016.08); *F21Y 2115/30* (2016.08)

(58) Field of Classification Search
CPC ..... F21S 43/239; F21S 43/14; F21S 43/26251
See application file for complete search history.

(56) References Cited

U.S. PATENT DOCUMENTS

| | | | | |
|---|---|---|---|---|
| 5,669,693 | A * | 9/1997 | Smith | F21S 43/245 362/511 |
| 2018/0022269 | A1* | 1/2018 | Mügge | B60Q 1/381 362/509 |
| 2018/0195680 | A1* | 7/2018 | Muegge | G03H 1/0236 |
| 2018/0290586 | A1* | 10/2018 | Muegge | F21S 43/40 |
| 2020/0240610 | A1* | 7/2020 | Thomae | F21S 43/236 |
| 2024/0142079 | A1* | 5/2024 | Göttlicher | F21S 43/14 |
| 2024/0360974 | A1* | 10/2024 | Hiller | F21S 43/15 |

FOREIGN PATENT DOCUMENTS

| | | | |
|---|---|---|---|
| DE | 102022131483 | A1 | 5/2024 |

* cited by examiner

*Primary Examiner* — Christopher E Dunay
(74) *Attorney, Agent, or Firm* — Vichit Chea; Price Heneveld LLP

(57) ABSTRACT

A vehicle exterior lamp assembly has an optical light transmission device having a first end, a second end opposite the first end and a side wall extending between the first end and the second end. A cover lens covering the second end of the optical light transmission device. One or more primary light sources are configured to input light into the first end of the optical light transmission device for emission as an output from the second end. A hologram is provided on the side wall of the optical light transmission device. A secondary light source is configured to illuminate the hologram to display an image on the side wall of the optical light transmission device.

20 Claims, 5 Drawing Sheets

VEHICLE EXTERIOR LAMP ASSEMBLY HAVING A HOLOGRAPHIC IMAGE

FIELD OF THE DISCLOSURE

The present disclosure generally relates to lighting devices, and more particularly relates to a vehicle exterior lamp such as a tail lamp having an illuminable light assembly and an illuminable holographic image.

BACKGROUND OF THE DISCLOSURE

Motor vehicles are commonly equipped with various light illumination devices assembled on the vehicle body exterior. For example, vehicle exterior lamps may include tail lamps at opposite rear end corners of the motor vehicle. It may be desirable to provide for a vehicle exterior lamp such as a tail lamp that efficiently provides external vehicle lighting and presents an additional viewable illuminated image.

SUMMARY OF THE DISCLOSURE

According to a first aspect of the present disclosure, a vehicle exterior lamp assembly has an optical light transmission device having a first end, a second end opposite the first end and a side wall extending between the first end and the second end. A cover lens covering the second end of the optical light transmission device. One or more primary light sources are configured to input light into the first end of the optical light transmission device for emission as an output from the second end. A hologram is provided on the side wall of the optical light transmission device. A secondary light source is configured to illuminate the hologram to display an image on the side wall of the optical light transmission device.

Embodiments of the first aspect of the present disclosure can include any one or a combination of the following features:

- one or more primary light sources comprises a plurality of primary light emitting diodes;
- the secondary light source comprises one or more secondary light emitting diodes;
- the secondary light source comprises one or more laser light sources;
- the side wall of the optical light transmission device is oriented substantially orthogonal to the first and second ends of the optical light transmission device;
- the optical light transmission device has a substantially rectangular shape;
- the optical light transmission device comprises a light guide blade;
- the light guide blade comprises a plurality of light diffusers on the side wall of the light guide blade that extends substantially parallel to one another;
- the hologram is located on a vehicle inboard side of the light guide blade;
- a lens is operatively coupled between the secondary light source and the hologram; and
- the lamp is a tail lamp.

According to a second aspect of the present disclosure, a vehicle exterior tail lamp assembly includes a light guide blade having a rear end, a front end and a side wall extending between the front end and the rear end. A cover lens covers the rear end of the light guide blade. A plurality of primary light sources are configured to input light to the front end of the light guide blade for emission as an output from the rear end of the light guide blade. A hologram is provided on the side wall of the light guide blade. A secondary light source is configured to illuminate the hologram to display an image on the side wall of the light guide blade.

Embodiments of the second aspect of the present disclosure can include any one or a combination of the following features:

- the plurality of primary light sources comprises a plurality of light emitting diodes;
- the secondary light source comprises one or more LEDs;
- the secondary light source comprises one or more laser light sources;
- the side wall of the light guide blade is oriented substantially orthogonal to the rear end of the light guide blade;
- the light guide blade has a substantially rectangular shape;
- the light guide blade comprises a plurality of light diffusers on the side wall of the light guide blade that extends substantially parallel to one another;
- a lens operatively coupled between the secondary light source and the hologram; and
- the hologram is located on a vehicle inboard side of the light guide blade.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
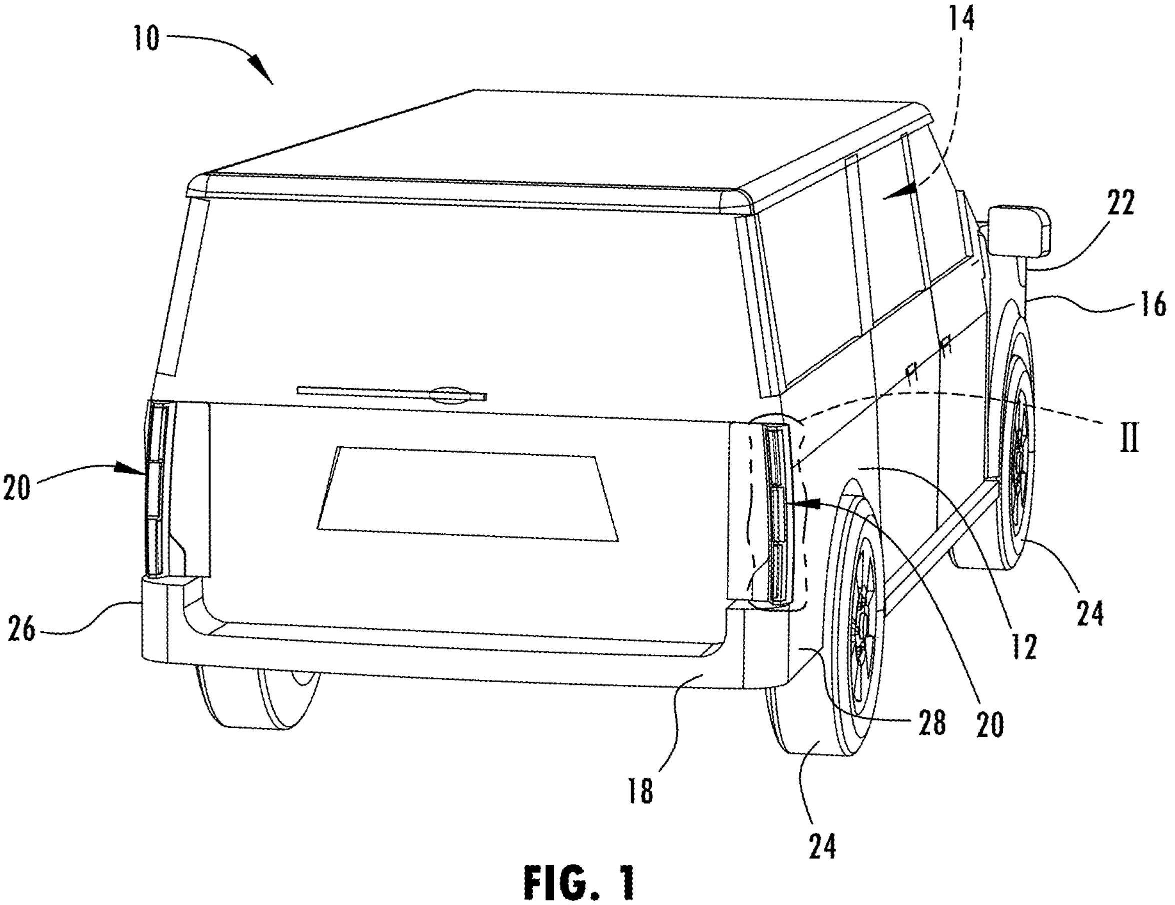
FIG. 1 is a rear side perspective view of a motor vehicle equipped with a pair of rear end tail lamps, each having an optical light transmission device and a hologram, according to one example.
Figure 2:
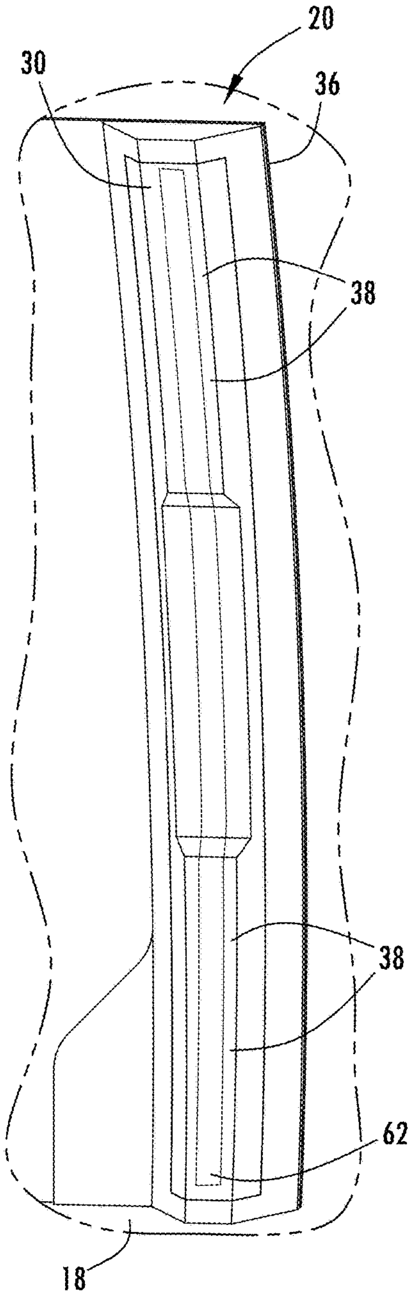
FIG. 2 is a rear perspective view of one of the tail lamps illustrated in FIG. 1.
Figure 3:
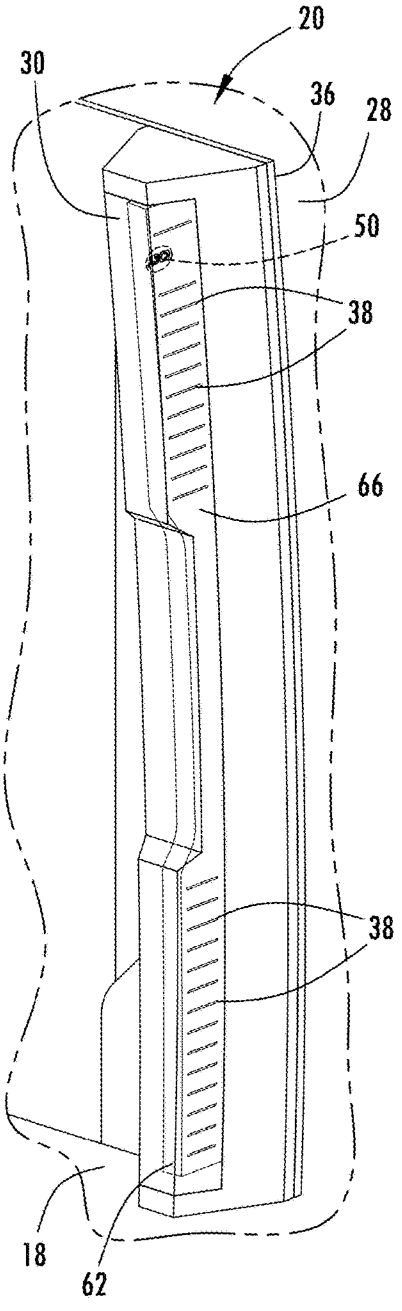
FIG. 3 is a first side perspective view of the tail lamp shown in FIG. 2.
Figure 4:
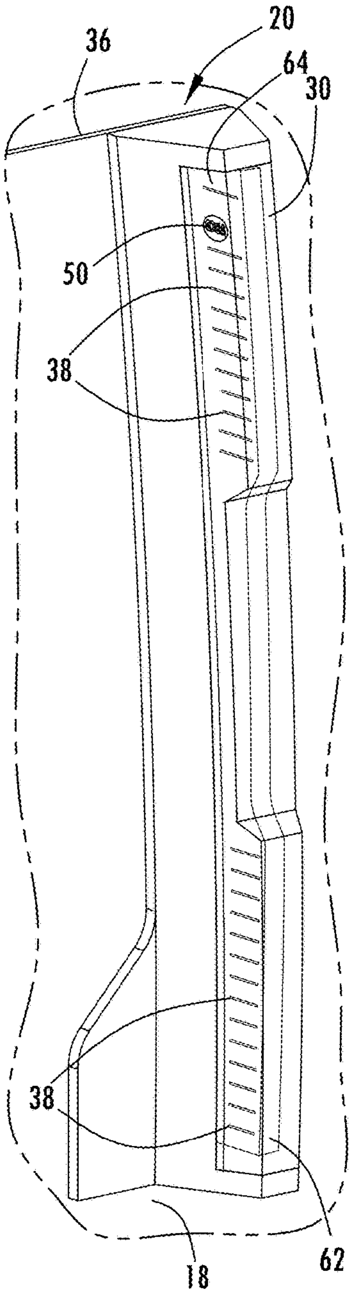
FIG. 4 is a second side perspective view of the tail lamp shown in FIG. 2.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle exterior lamp shown as a tail lamp. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-7, a vehicle exterior lamp 20, configured as a vehicle tail lamp, is illustrated including an optical light transmission device including a light guide blade having a first end, a second end opposite the first end, and a side wall extending between the first and second ends, a cover lens extending over the second end and the side wall, and a plurality of primary light sources configured to input light to the first end of the optical light transmission device for emission as an illuminated beam output from the second end of the optical light transmission device. The vehicle exterior lamp also includes a hologram configured to present an illuminated image provided on the side wall of the optical light transmission device and a secondary light source configured to illuminate the hologram to illuminate the image on the side wall of the optical light transmission device.

With particular reference to FIG. 1, the motor vehicle 10 is generally shown having a vehicle body 12 defining an interior cabin, referred to as a passenger compartment 14. The motor vehicle 10 may be configured as a wheeled motor vehicle such as a sedan, a sport utility vehicle (SUV), a van, a truck, a bus or other motorized vehicle which may be configured to transport one or more passengers. The passenger compartment 14 is generally defined by a vehicle body 12 and may be configured with a seating arrangement that may include one or more rows of seating for seating passengers and a driver of the motor vehicle 10 and various controls and passenger accommodations.

The motor vehicle 10 is shown as a wheeled motor vehicle having a plurality of tire and wheel assemblies 24. The motor vehicle 10 has a front end 16, a rear end 18, a left side 26 and a right side 28. A pair of tail lamp assemblies 20 are located on the vehicle body 12 at the rear end 18 at the opposite lateral rear corners abutting the rear left side 26 and rear right side 28. The pair of tail lamp assemblies 20 provide tail lamp lighting at the rear end 18 of the motor vehicle 10 which may be used for rear light illumination rearward of the motor vehicle 10, brake light illumination, turn signal illumination and flasher indication illumination, for example. In addition, a pair of head lamp assemblies 22 are located on the vehicle body 12 at the front end 16 of the motor vehicle 10 located on opposite front end corners abutting the front left side 26 and front right side 28. The pair of head lamp assemblies 22 may provide light illumination forward of the motor vehicle 10 as well as turn signal, flasher and fog lighting, for example. The tail lamp assemblies 20 and head lamp assemblies 22 are exterior vehicle lamp assemblies which are shown and described herein according to one embodiment. The head lamp assemblies 22 generally illuminate light forward of the motor vehicle 10, whereas the tail lamp assemblies 20 illuminate light generally rearward of the motor vehicle 10. It should be appreciated that light illuminated from the head lamp assemblies 22 and tail lamp assembly 20 may also be visible from the left and right sides 26 and 28 of the motor vehicle 10.

Figure 5:
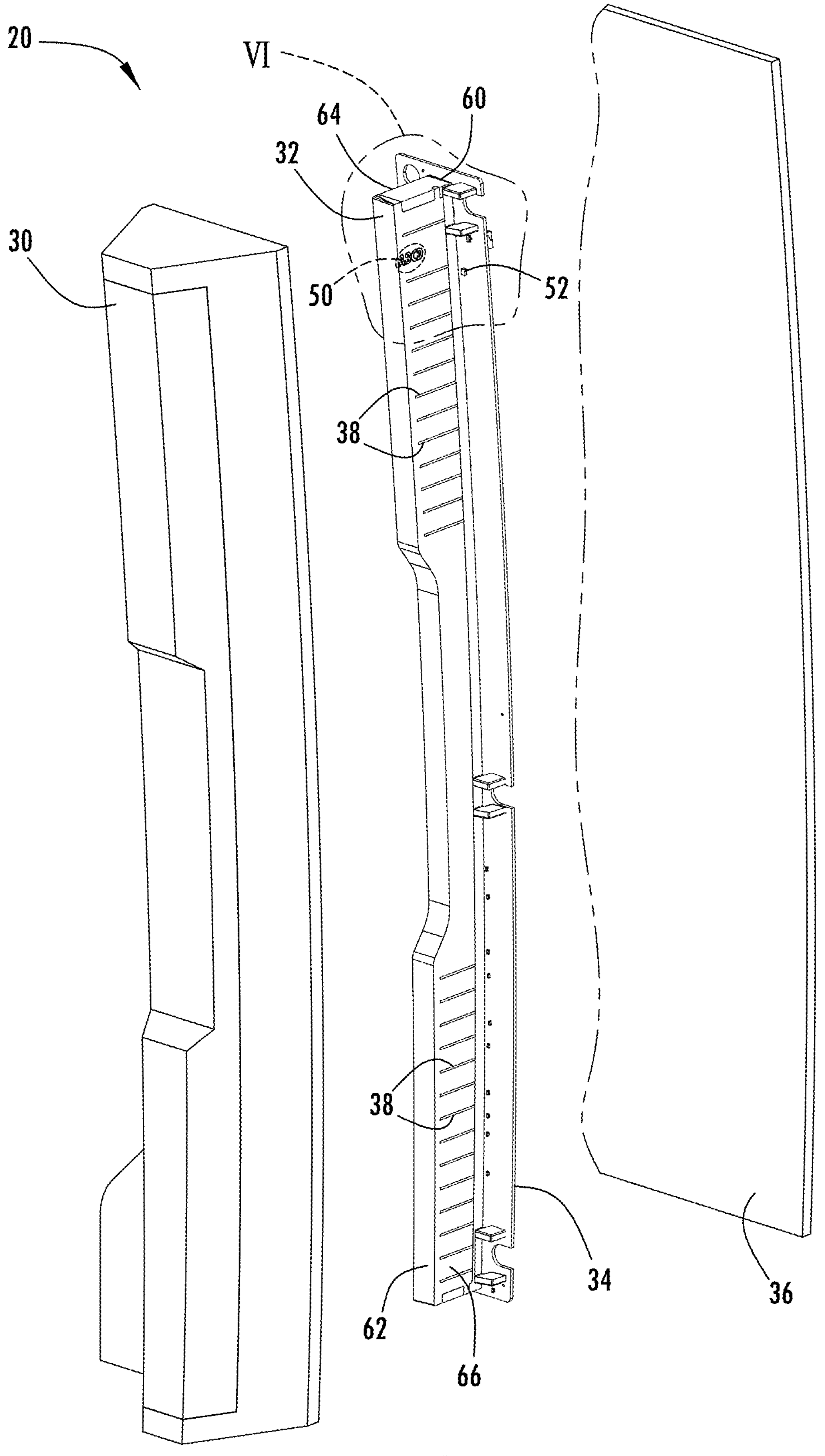
FIG. 5 is an exploded view of the vehicle tail lamp illustrating the optical light transmission device and hologram, according to one example.
Figure 6:
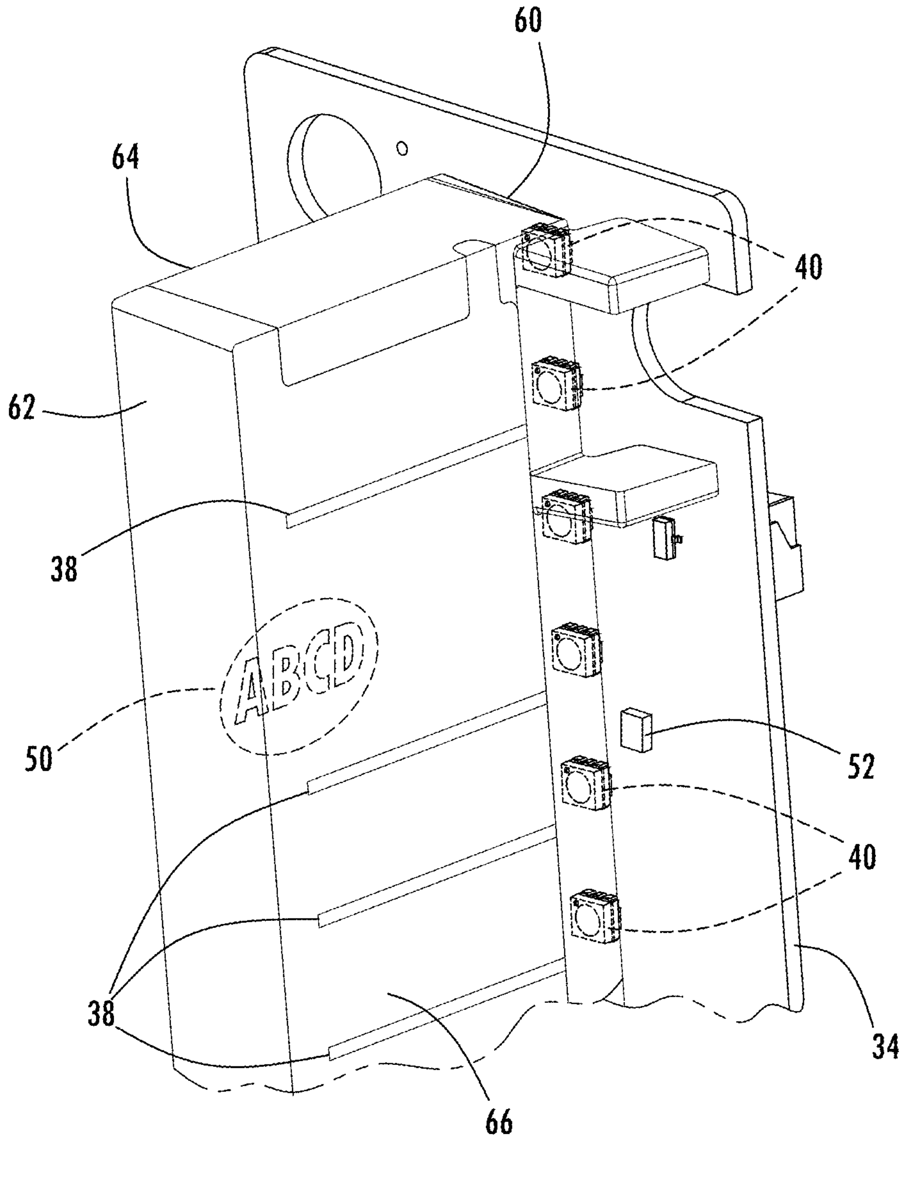
FIG. 6 is an enlarged view of section VI of FIG. 5 further illustrating the optical light transmission device and hologram.

The vehicle tail lamp assembly 20 is illustrated in FIGS. 2-5 according to one exemplary embodiment. In the example shown, the vehicle tail lamp assembly 20 is generally configured as a generally rectangular vertically elongated exterior lamp assembly having a height extending in a vertical direction and a width that is generally shorter than the height, according to one example. It should be appreciated that the tail lamp assembly 20 may have other shapes and sizes, according to other examples. As seen in FIG. 5, the vehicle tail lamp assembly 20 has a mounting plate 36 at the front end and a cover lens 30 at the rear end. The mounting plate 36 is configured to connect to a support on the motor vehicle 10 or is part of a support on the motor vehicle 10 such as a support pillar structure and generally is shaped to conform with the vehicle body 12. The cover lens 30 is a light transmissive lens that covers the exterior and allows light to pass through.

The vehicle tail lamp assembly 20 also includes an optical light transmission device configured as a light guide blade 32 which is shown coupled to a printed circuit board (PCB) 34. The printed circuit board 34 may be connected to the mounting plate 36 such as via fasteners, for example, screws or bolts or may otherwise be connected. The printed circuit board 34 generally includes electrical circuitry and further includes a plurality of primary light sources 40 which are spaced apart and extend in a linear array extending vertically on the printed circuit board 34 and optically aligned with the light guide blade 32. It should be appreciated that the vehicle tail lamp assembly 20 may include one or more primary light sources. The plurality of primary light sources 40 may include a plurality of light emitting diodes (LEDs), according to one example. Each of the plurality of primary light sources 40 is operative to project light illumination vehicle rearward generally extending from a front first end of the light guide blade 32 to a rear second end of the light guide blade 32 so as to produce a light illumination beam projecting vehicle rearward. The plurality of primary light sources 40 may include two more LEDs. In one example, the plurality of primary light sources 40 may include forty to fifty LEDs.

The light guide blade 32 is an example of an optical light transmission device that may be made of a clear optical light transmission medium such as polymethyl methacrylate (PMMA) which provides an optical light transmission medium that is generally visibly clear and transmit light therethrough. The light guide blade 32 operates as a light guiding mechanism that may also operate as an optical lens to transmit light from the front first end to the rear second end. According to one example, the optical transmission medium of the light guide blade 32 may provide little or no light beam collimation. The light guide blade 32 in the example shown is generally elongated with a longer vertical height as compared to the width. The light guide blade 32 has a generally rectangular configuration having a front wall 60 at the front first end aligned with the plurality of primary light sources 40, a rear wall 62 at the rear second end providing the light beam output rearward of the motor vehicle 10, and left and right side walls 64 and 66 that extend substantially orthogonal to the front and rear end walls 60 and 62.

Each of the left and right side walls 64 and 66 includes a plurality of textured strips that act as light diffusers 38. The light diffusers 38 generally extend horizontally from the front end of the light guide blade 32 towards the rear end of the light guide blade 32 but terminates short of the rear end. The light diffusers 38 may be formed with a laser texturing process and operate to diffuse light as seen from the left and the right sides of the light guide blade 32. As such, a viewer viewing either side of the tail lamp assembly 20 may view the plurality of stripes of diffused light.

The light guide blade 32 further includes a hologram 50 provided on one of the side walls 64 and 66 of the light guide blade 32. The hologram 50 may be configured as a three-dimensional image generator that creates a three-dimensional image using light, for example. In the example shown, the hologram 50 may be located on the inner wall 64 on the vehicle inboard side for generating a holographic image viewable from the outside. The hologram 50 may include an image such as a logo, text and or other characters, for example. The hologram 50 may be made of a holographic film plate, according to one example. The hologram 50 is preferably located between two adjacent strips of light diffusers 38, such that the hologram 50 does not overlap one or more light diffusers 38. To accommodate a larger hologram 50, one or more light diffusers 38 may be removed or a greater spacing between light diffusers 38 may be provided.

Figure 7:
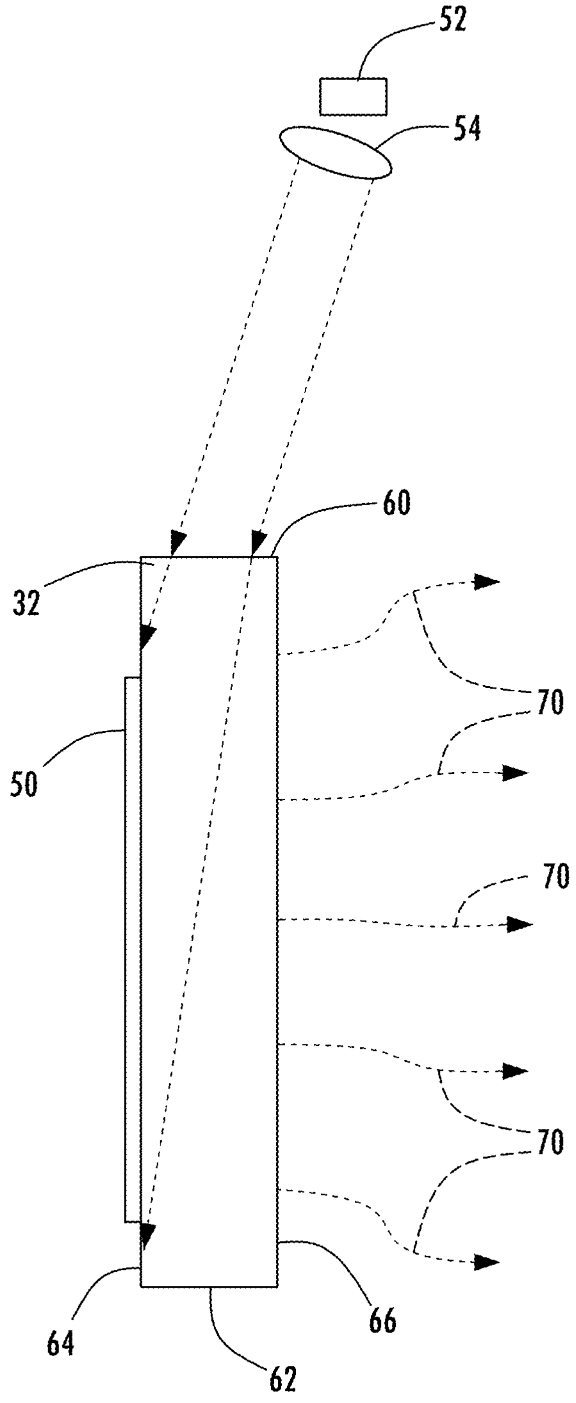
FIG. 7 is a schematic top view of the optical light transmission device having the hologram on a rear side and a secondary light source illuminating the hologram, according to one example.

A secondary light source 52 is located on the printed circuit board 34 and aligned generally at a similar vertical elevation with the hologram 50. The secondary light source is aligned to project light illumination onto the hologram 50 as seen in FIG. 7. As shown, the secondary light source 52 projects light through an optical lens 54 which in turn may collimate the light and direct the collimated light onto the front wall 60 of the light guide blade 32 which passes through to the hologram 50. The secondary light source 52 may include one or more LEDs, according to one example. According to another example, the secondary light source 52 may include one or more lasers. The light output from the secondary light source 52 may be colored light, for example. As such, the optical lens 54 directs collimated light onto the surface of the hologram 50 such that the light patterned by the hologram 50 is then illuminated towards the side wall 66 in a hologram image beam 70. The optical lens 54 collimates the light from the secondary light source 52 to generate a collimated light beam directed onto the hologram 50 which in turn diffracts the light beam and outputs diffracted light in the output beam 70. In doing so, the light guide blade 32 operates as a light guide to direct the primary light vehicle-rearward and generates a secondary light beam in the form of an image on the side wall in the output beam 70.

It should be appreciated that the optical lens 54 may include a Fresnel lens arranged at a tilted angle towards the hologram 50, according to one example. According to another example, the optical lens 54 may include a dome lens tilted at an angle towards the hologram 50. Other light focusing and collimating optics are contemplated, according to other examples.

Accordingly, a vehicle exterior tail lamp assembly 20 is provided for a motor vehicle 10 that provides an optical light transmission device such as a light guide blade 32 illuminating light from a rear end of the tail lamp assembly 20 and for further illuminating a lighted image from a hologram 50 on the side wall of the tail lamp assembly 20 such that the hologram light output may be visible to a viewer from the side of the tail lamp assembly 20 and the motor vehicle 10. This may be particularly advantageous by providing an illuminated graphical output image such as a logo for viewing.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle exterior lamp assembly comprising:

an optical light transmission device having a first end, a second end opposite the first end and a side wall extending between the first end and the second end;

a cover lens covering the second end of the optical light transmission device;

one or more primary light sources configured to input light into the first end of the optical light transmission device for emission as an output light beam from the second end;

a hologram provided on the side wall of the optical light transmission device; and a secondary light source configured to illuminate the hologram to display an image on the side wall of the optical light transmission device such that the hologram is illuminated in a hologram image beam orthogonal to the output light beam.

2. The vehicle lamp assembly of claim 1, wherein one or more primary light sources comprises a plurality of primary light emitting diodes.

3. The vehicle lamp assembly of claim 1, wherein the secondary light source comprises one or more secondary light emitting diodes.

4. The vehicle lamp assembly of claim 1, wherein the secondary light source comprises one or more laser light sources.

5. The vehicle lamp assembly of claim 1, wherein the side wall of the optical light transmission device is oriented substantially orthogonal to the first and second ends of the optical light transmission device.

6. The vehicle lamp assembly of claim 5, wherein the optical light transmission device has a substantially rectangular shape.

7. The vehicle lamp assembly of claim 1, wherein the optical light transmission device comprises a light guide blade.

8. The vehicle lamp assembly of claim 7, wherein the light guide blade comprises a plurality of light diffusers on the side wall of the light guide blade that extends substantially parallel to one another.

9. The vehicle lamp assembly of claim 1, wherein the hologram is located on a vehicle inboard side of the light guide blade.

10. The vehicle lamp assembly of claim 1, further comprising a lens operatively coupled between the secondary light source and the hologram.

11. The vehicle lamp assembly of claim 1, wherein the lamp is a tail lamp.

12. A vehicle exterior tail lamp assembly comprising:

a light guide blade having a rear end, a front end and a side wall extending between the front end and the rear end;

a cover lens covering the rear end of the light guide blade;

a plurality of primary light sources configured to input light to the front end of the light guide blade for emission as an output light beam from the rear end of the light guide blade;

a hologram provided on the side wall of the light guide blade; and a secondary light source configured to illuminate the hologram to display an image on the side wall of the light guide blade such that the hologram is illuminated in a hologram image beam orthogonal to the output light beam.

13. The vehicle exterior tail lamp assembly of claim 12, wherein the plurality of primary light sources comprises a plurality of primary light emitting diodes.

14. The vehicle exterior tail lamp assembly of claim 12, wherein the secondary light source comprises one or more secondary light emitting diodes.

15. The vehicle exterior tail lamp assembly of claim 12, wherein the secondary light source comprises one or more laser light sources.

16. The vehicle exterior tail lamp assembly of claim 12, wherein the side wall of the light guide blade is oriented substantially orthogonal to the rear end of the light guide blade.

17. The vehicle exterior tail lamp assembly of claim 16, wherein the light guide blade has a substantially rectangular shape.

18. The vehicle exterior tail lamp assembly of claim 12, wherein the light guide blade comprises a plurality of light diffusers on the side wall of the light guide blade that extends substantially parallel to one another.

19. The vehicle exterior tail lamp assembly of claim 12, further comprising a lens operatively coupled between the secondary light source and the hologram.

20. The vehicle exterior tail lamp assembly of claim 12, wherein the hologram is located on a vehicle inboard side of the light guide blade.

* * * * *